United States Patent [19]

Samanta

[11] 3,910,091
[45] Oct. 7, 1975

[54] APPARATUS AND METHOD FOR COLD EXTRUSION OF GEARS

[75] Inventor: Shyam K. Samanta, Ypsilanti, Mich.

[73] Assignee: Ford Motor Company, Dearborn, Mich.

[22] Filed: Aug. 8, 1974

[21] Appl. No.: 495,708

Related U.S. Application Data

[63] Continuation-in-part of Ser. No. 465,634, April 30, 1974, abandoned.

[52] U.S. Cl. .................... 72/256; 29/159.2; 72/267
[51] Int. Cl.² ......................................... B21C 23/00
[58] Field of Search ............ 72/267, 256, 266, 260; 29/159.2

[56] References Cited
UNITED STATES PATENTS

| | | |
|---|---|---|
| 3,599,469 | 8/1971 | Bassoff ............................. 29/159.2 |
| 3,605,475 | 9/1971 | Eakin ................................... 72/256 |
| 3,813,909 | 6/1974 | Roger ................................ 29/159.2 |

Primary Examiner—C. W. Lanham
Assistant Examiner—Robert M. Rogers
Attorney, Agent, or Firm—Donald J. Harrington; Keith L. Zerschling

[57] ABSTRACT

A method and apparatus for manufacturing gears from a hollow blank wherein the blank is fed into an extrusion die having internal teeth, and wherein an extrusion force is applied to the blank by means of a sleeve surrounding a mandrel, the sleeve being adapted to apply an extrusion force to the blank thereby advancing the blank partially through the extrusion die, a final extrusion action being accomplished by the extrusion force transmitted to the blank by a following blank inserted into the die as the extrusion process is repeated.

15 Claims, 13 Drawing Figures

APPARATUS AND METHOD FOR COLD EXTRUSION OF GEARS

REFERENCE TO RELATED APPLICATIONS

This application is a continuation-in-part of my co-pending application, Ser. No. 465,634, filed Apr. 30, 1974, now abandoned.

GENERAL DESCRIPTION OF THE INVENTION

My invention relates generally to gear extrusions. It is adaptable to manufacturing processes for forming helical gears and pinions of the type used in gear transmissions for use in automotive vehicle drivelines. Such planet pinions, as well as the gears with which they mesh, presently are formed by machining operations that include hobbing and shaving. Each of these steps is carried out at a separate work location with specialized machinery. My present invention eliminates the multiple machining steps and replaces them with a single extrusion operation.

The principal method steps in my improved process are carried out on a hollow, cylindrical workpiece. The central opening in the workpiece may be formed by any of several methods such as by drilling, by using powder metallurgy techniques, by cutting hollow tubing, etc. I will describe for purposes of this specification, however, a backward extrusion and piercing operation for forming a central opening in a solid, cylindrical workpiece.

In the preparation steps I employ a well lubricated blank which is cut to a strategic size from a coil or a bar and coined to a suitable shape by means of a die assembly and two punches for entry into an upsetting die. The squared blank then is transferred to a sizing die assembly where two punches are used to upset the blank to suitable dimensions for entry into the extrusion die. The sized blank then is transferred to an extrusion die where an extrusion punch is used to backward extrude the blank to form a cup. This operation is followed by a piercing operation which takes place by passing a piercing punch through the central opening in the blank.

The first of the principal method steps of my process takes place when the blank is transferred to a gear extrusion die assembly. The extrusion step occurs as a sleeve and mandrel assembly advances the blank partially through the gear extrusion die. Following this operation the mandrel and sleeve assembly is retracted thereby finishing to close tolerances the inside diameter of the central opening of the blank. Final extrusion and ejection of the extruded part occurs as the next blank is inserted into the gear extrusion die assembly and advanced by the sleeve and mandrel assembly. As each workpiece is advanced through the extrusion die, it may be collected in a suitable conveyor apparatus.

The mandrel, which is surrounded by the sleeve punch, has a straight portion and a land portion. The diameter of the land is slightly larger than the final desired inner diameter of the extruded gear. The straight portion of the mandrel has a diameter slightly less than the land diameter. The inner diameter of the billet is slightly larger than the land diameter.

In its broadest aspect my gear extrusion method is a two-step process. In the first step a gear is partially extruded by applying an extrusion force to a hollow blank by means of a sleeve which surrounds a mandrel inserted in the blank. After this step the mandrel and sleeve assembly is withdrawn from the die assembly leaving the partially extruded blank in place, and a second hollow blank is inserted into the side assembly. A second extrusion then is performed in like manner to complete extrusion of the initial billet and corresponding partial extrusion of the second. In a production operation these steps would be repeated in an unending sequence.

The extrusion die is constructed with inner projecting helical teeth whose function is to form teeth on the outer periphery of the gear blank. During the extrusion process part of the mandrel extends completely through the blank and projects beyond the toothed portion of the die. Thus the inner diameter of the extruded part is controlled with respect to inward flow of metal during the extrusion process by the body diameter of the mandrel.

The land portion of the mandrel performs an ironing function in the bore of the extruded part during each withdrawal of the mandrel from the extruded part. This sizing function also occurs upon each insertion of the mandrel into the previously partially extruded gear. This feature of my invention results in a final bore for the extruded part which is closely sized and which has an excellent surface finish requiring no subsequent machining or finishing operations.

This function of the land portion of the mandrel could also be accomplished by use of a tapered mandrel. In some cases, where a closely sized inside diameter is not required, a straight mandrel may be used.

In addition to the features of my invention related to the ironing and resultant excellent finish of the inner diameter of the finished part, the mandrel performs another very important function. Because the volume of metal contained in the blank is prevented from flowing inwardly by more than a very small and controlled amount, the major metal flow is in the length-direction of the blank. But since the outer diameter of the blank is substantially equal to the outer diameter of the finished gear, the material in the outer radial region of the hollow blank is constrained to flow axially in a helical path through the cavity outlined by the extrusion die teeth. This results in fully formed teeth having virtually no defects, and which require no subsequent hobbing or shaving.

As each billet is advanced to its final form through the extrusion die, it may be collected in a suitable container or conveyor apparatus.

Though the mandrel enters into the toothed zone of the extrusion die, the mandrel and sleeve need not be of the rotating type. There may be some relative rotation, however, between the end face of the sleeve and the contacting face of the billet during the extrusion process.

The extrusion die assembly comprises a die insert, a gear extrusion die and a back-up ring. These three pieces are assembled in a stress ring that has a tapered outer diameter and the assembly is held in an outer ring. The die insert's inner diameter can be straight or slightly tapered. The inner diameter of the gear extrusion die has a straight portion, the diameter of which is essentially the same as the inner diameter of the die insert and is slightly larger than the billet diameter. Following this straight portion is a conical portion and a toothed portion.

A very small part of the toothed portion has full depth and the rest has a small relief. Since the full depth contact region is small, the development of excessive friction is prevented and the relieved portion of the die is an aid in ejection of the extruded gear from the die. The toothed portion of the gear extrusion die incorporates a correction for possible lead error in the extruded teeth of the gear originating from the elastic unwinding of the teeth as the gear comes out of the toothed portion of the die.

I am aware of proir references that deal generally with the topic of cold extrusion of gears and pinions. One such reference is Eakin et al., U.S. Pat. No. 3,605,475. The Eakin et al. reference describes a method and apparatus for extruding gear blanks, although it is not confined to the subject of forming finished gears. In the Eakin et al device, a blank is fed into the gear blank extrusion die and the metal that is displaced by the die teeth upon advancement of the blank flows radially inward toward the bore. The resulting gear blank has to be machined to provide an accurate central bore opening before it can be used. The extrusion of gear blanks is accomplished by an extrusion operation wherein a series of blanks is pushed through extrusion die as pressure is applied to the blanks by a punch that is actuated by a press.

One of the ways the Eakin et al. disclosure is distinguished from my present disclosure is the distinctive means in my method for accommodating the flow of the material in the extrusion process. In my apparatus the material flows axially as the metal is displaced into the teeth grooves. A mandrel is disposed within the central opening in the blank during the extrusion operation, thereby maintaining perfect concentricity and a specified uniform diameter of the bore during the extrusion operation. This also results in the formation of fully defined and accurately shaped teeth. Furthermore, the final inside diameter calibration for the bore is accomplished as the mandrel is withdrawn.

The Eakin et al. process teaches the use of a punch with a flat end face which does not enter the toothed portion of the die. The lack of any support for the inner core of the blank undergoing extrusion is a deficiency which is remedied by the mandrel employed in my process.

Material flows in my improved extrusion process in a controlled manner and a high degree of tolerance is maintained for that reason. No finish machining is required except for a small amount of clean-up operation on the sides of the gear to remove the axially projecting ends of the individual gear teeth.

Although I have described an extrusion process for helical gears, the same method steps may be used for forming straight tooth parts.

PARTICULAR DESCRIPTION OF THE INVENTION

Figure 1:
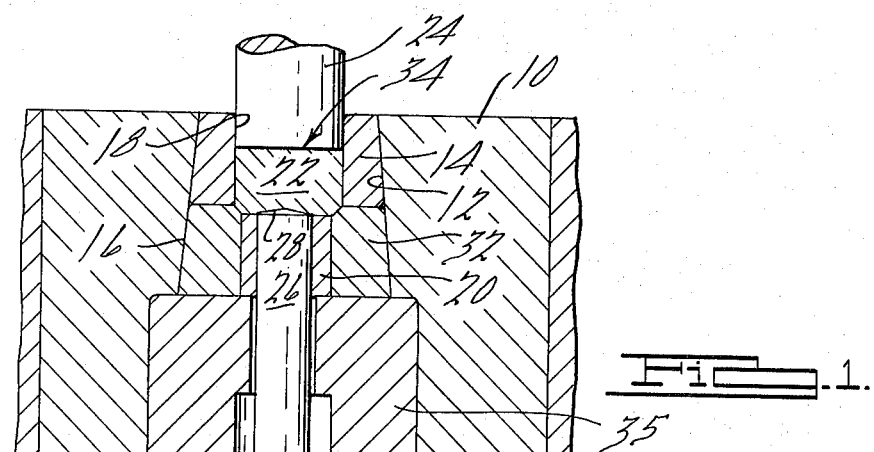
FIG. 1 shows a die for squaring a pre-cropped gear blank.
Figure 2:
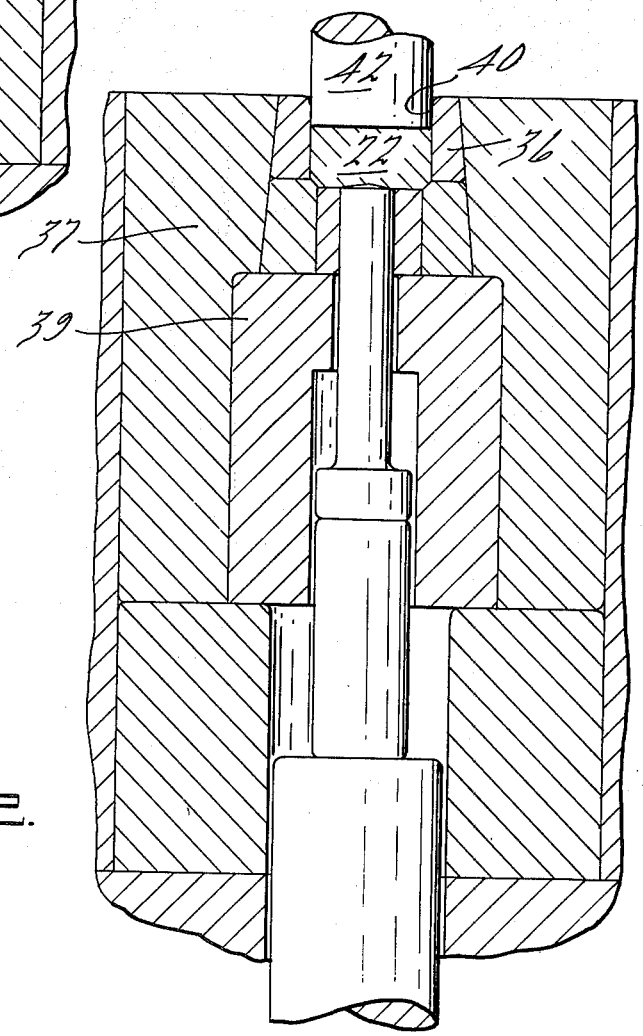
FIG. 2 shows a die assembly for coining and sizing a blank by an upsetting operation after the blank is transferred from the die assembly of FIG. 1.

In FIG. 1 reference character 10 designates a housing for an extrusion die assembly. The housing is provided with a tapered opening 12 within which is positioned inserts 14 and 32 having peripheral surface 16 that is tapered so that it registers with the tapered opening 12. Insert 14 is provided with a central bore that includes a cylindrical portion 18.

The blank 22 is received within the bore 18. A backup punch 26 is positioned within the sleeve 20 which rests upon a spacer sleeve 35.

The end of the punch 26 is provided with a coned surface 28.

Figure 6:
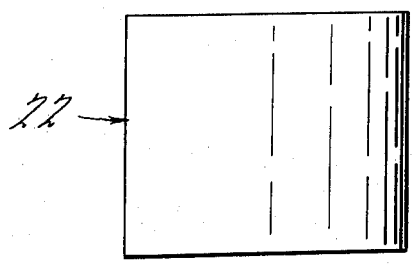
FIG. 6 shows a cropped billet prior to entry into the sizing die assembly.

FIG. 6 shows a cropped billet which is identified by the same reference character used in FIG. 1; namely, reference character 22.

Figure 7:
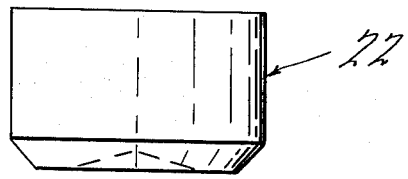
FIG. 7 shows a sized billet.

The working punch 24 enters the cylindrical portion 18 of the die insert 14. It is formed with a flat end surface shown at 34. The sleeve 20 and the backup punch 26 provide a reaction surface for the billet 22 when the sizing punch 24 is forced into the sleeve 14. Following the sizing operation the blank 22 assumes the shape as shown in FIG. 7. The billet may be removed by advancing the backup punch 26 upon removal of the punch 24.

Figure 8:
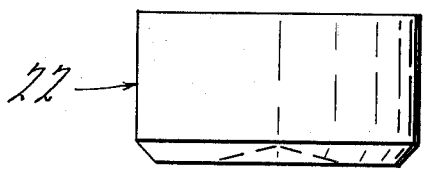
FIG. 8 shows a billet after it is upset following the sizing operation.
Figure 9:
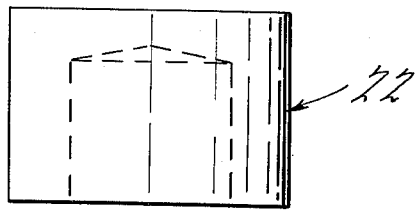
FIG. 9 shows the billet after it has been backward extruded.
Figure 10:
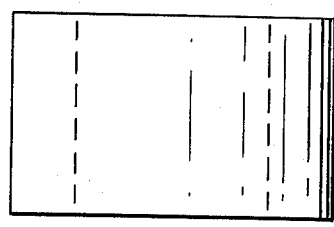
FIGS. 10, 10A and 10B show, respectively, a hollow gear blank, a partially extruded gear and a finished extruded gear.
Figure 10A:
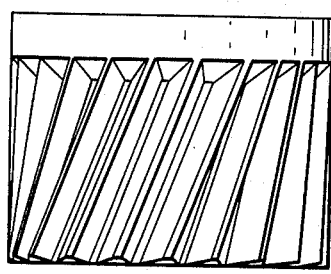
Figure 10B:
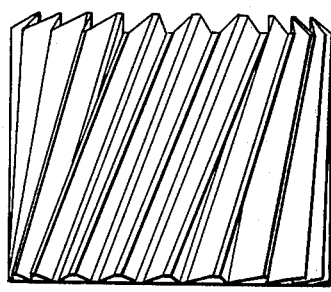

At the next station the billet 22 is prepared for the upsetting operation. This is done by inserting the billet into a tapered die sleeve 36 which has a cylindrical central opening 40. Sleeve 36 is received in body 37 and is held in position by spacer sleeve 39. Opening 40 receives a punch 42. Upon applying pressure to punch 42, the billet assumes the shape shown in FIG. 8.

Figures 3, 3A:
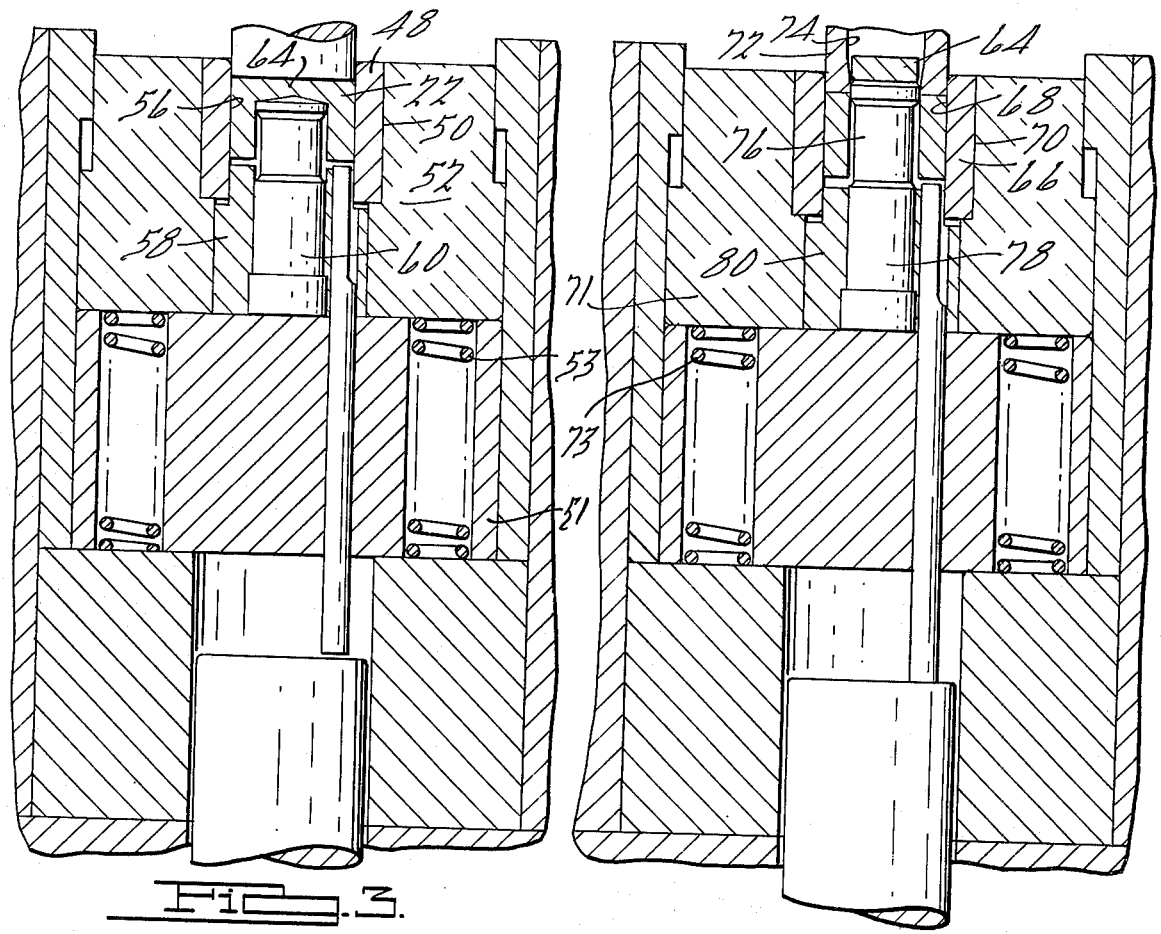
FIG. 3 shows an extrusion die assembly for backward extrusion of the workpiece after it is transferred from the die assembly of FIG. 2.
FIG. 3A shows a piercing die assembly for piercing a workpiece that is extruded in the die assembly of FIG. 3.

The extrusion operation is accomplished by the extrusion die assembly shown in FIG. 3. This assembly comprises a die insert 48 which is formed with an external straight surface 50 so that it is in registry with an opening formed in the housing 52. The insert 48 is provided with a straight bore portion 56. The bore portion 56 receives the workpiece 22 and the extrusion punch sleeve 58 and a cooperating extrusion punch 60. The extrusion punch 60 acts against the workpiece 22 so that the metal flows in a backward direction as viewed in FIG. 3 in a direction that is opposite to the direction of the movement of the punch 60. Following completion of the movement of the punch, a web 64 remains on the workpiece. To remove the web 64 the workpiece is transferred to the next station, which is the piercing operation station.

The piercing tool assembly is shown in FIG. 3A. FIG. 3A shows an insert 66 with the straight sided cylindrical bore 68 and a straight sided outer surface 70. The surface 70 registers with a bore in a die assembly housing similar to the ones shown in FIG. 3. In both the FIG. 3 and FIG. 3A assemblies the die bodies 51 and 71, respectively, are positioned movably in support openings in fixed supports. Springs 53 and 73, respectively, resist shfiting movement of the die bodies under the impact force of the punches.

A backup sleeve 72 is received within the front end of the insert 66. It is formed with a central opening 74 which is adapted to register with one end 76 of a working punch 78 during the piercing operation. The punch 78 is mounted within a punch sleeve 80. The workpiece is located directly in front of the sleeve 80 and upon advancement of the punch 72 through the insert 66, the web 64 of the workpiece is sheared. The workpiece then is removed to the last station where the final extrusion operation occurs. This is shown in FIG. 4 which illustrates a die assembly holder ring 82 with a central opening 84 within which a stress ring 86 is positioned.

A first backup ring for the assembly is shown at 88. A die insert 90 having internal helical die teeth is positioned adjacent the backup ring 88 within the stress ring 86. A front insert 92 is situated directly adjacent the die insert 90. A sleeve 94 together with the mandrel 98 enters the front insert 92 as the blank is advanced by the mandrel sleeve assembly holder.

The mandrel 98 is inside the central opening of the workpiece prior to the instant the sleeve 94 meets the blank 22. The sleeve and mandrel assembly 94 and 98 then is advanced, thereby causing the workpiece 22 to be extruded through internal helical die teeth spaces 100. The thickness of the internal teeth progressively decreases and the root diameter increases from top to bottom as viewed in FIG. 4, thereby permitting the workpiece to drop through the backup ring 88 after final extrusion.

Figure 4:
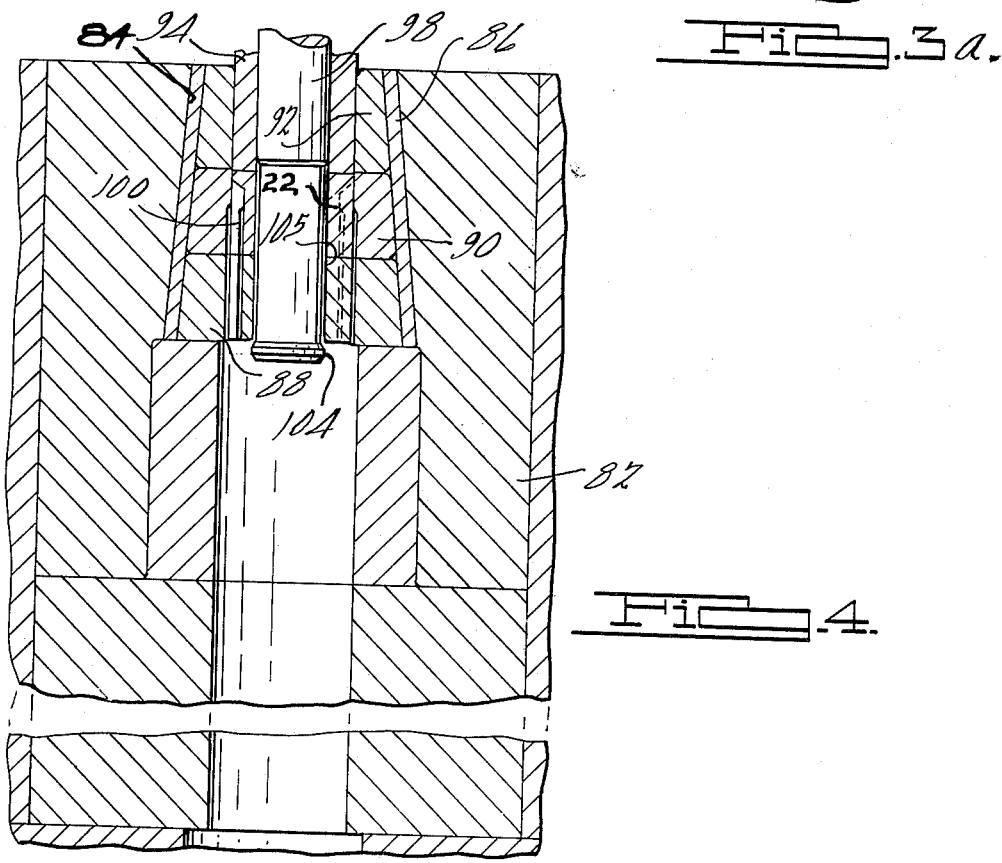
FIG. 4 shows a final extrusion die assembly.
Figure 5:
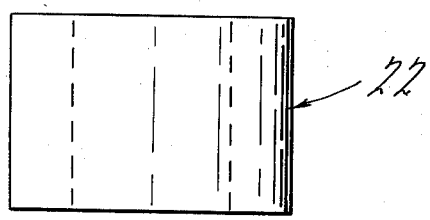
FIG. 5 shows a finished hollow blank.

The final extrusion operation of FIG. 4 is accomplished by inserting another workpiece and applying an extrusion force on that next workpiece by the sleeve 94. As the mandrel 98 and sleeve 94 assembly is withdrawn, the inside diameter of the workpiece 22 is formed to a correct diameter by the mandrel land 104 on the end of the mandrel. The radial flow of metal during the final extrusion operation causes a change in the inside diameter which may be corrected by the land 104.

The metal flow during the extrusion process is controlled by the straight portion 105 of the mandrel 94, thereby controlling the inner diameter of the gear.

Having described a preferred embodiment of my invention, what I claim and desire to secure by U.S. Letters Patent is:

1. A process for extruding gears with fully formed gear teeth comprising the steps of inserting a first hollow blank within a die having internal teeth, said internal teeth comprising a full depth portion extending axially for a small part of the axial dimension of said die and a relatively long portion that is relieved to provide guiding action with minimum friction as the blank progresses through said die and to provide support for the full depth portion of the die teeth, the blank having received therethrough a mandrel with a precise diametrical fit within the central opening in the blank, a sleeve surrounding the mandrel and forming therewith a mandrel and sleeve assembly, advancing the mandrel and sleeve assembly and applying thereby an axial extruding force on the blank whereby the blank is partially extruded through the die tooth spaces, retracting the mandrel and sleeve assembly and placing a second hollow blank adjacent the first blank, and advancing the mandrel and sleeve assembly into engagement with the second blank whereby final extrusion of the first blank to form a finished gear occurs as the second blank is partially extruded, the outside diameter of each blank being substantially equal to the outside diameter of the corresponding gear.

2. The method steps set forth in claim 1 wherein the mandrel provides radial support for the hollow blank as the blank is forced through the die tooth spaces thereby controlling the blank material flow so that fully formed teeth are extruded as radial material flow of blank material is resisted.

3. The method steps set forth in claim 2 wherein the mandrel is provided with a cylindrical portion of predetermined diameter adjacent one end of the sleeve whereby the internal diameter of the hollow extruded blank is controlled.

4. A process for extruding gears comprising the steps of inserting a cylindrical workpiece in an extrusion die, said die having a central opening within which the workpiece is fitted, a backup punch located on one side of said die and an extrusion punch adapted to advance into the workpiece from the other side thereof, said extrusion punch causing axial flow of the material of said workpiece in a direction opposite to the direction of motion of said extrusion punch, transferring said workpiece to a piercing die that surrounds said workpiece, moving a piercing punch through the workpiece thereby shearing the material from the center of said workpiece to provide a bore therethrough, transferring the finished workpiece to a gear extrusion die that surrounds the workpiece, said die having internal helical teeth formed therein, inserting a mandrel through the extrusion die and through the workpiece, said mandrel having on one end thereof a calibrated inside diameter forming portion, applying an extrusion force to said workpiece by a mandrel sleeve thereby moving the workpiece through the internal teeth cavity of the extrusion die, retracting the mandrel whereby the inside diameter of said workpiece is precisely maintained at a desired value and mounting another pierced workpiece adjacent the aforesaid workpiece and applying an extrusion force, the first mentioned workpiece being pushed from the extrusion die by the second mentioned workpiece.

5. The combination as set forth in claim 4 wherein the piercing operation includes entry of a punch through the workpiece, said punch being surrounded by a punch sleeve that maintains the workpiece in position, said punch shearing the material from the center of the extruded workpiece thereby forming a relatively uniform hole through the said workpiece.

6. The extrusion process as set forth in claim 4 wherein the extrusion step is preceded by a squaring step whereby the workpiece which is generally cylindrical in shape is inserted in a squaring die, a backup punch located in said squaring die adjacent said blank, said squaring die surrounding said workpiece and restraining radially outward flow of material of the workpiece and advancing a squaring punch into said squaring die to form the workpiece to provide a controlled surface configuration on either axial side of said workpiece and to form a uniform outside diameter on said workpiece.

7. The extrusion process as set forth in claim 5 wherein the extrusion step is preceded by a sizing step whereby the workpiece which is generally cylindrical in shape is inserted in a sizing die, a backup punch located in said sizing die adjacent to said blank, said sizing die surrounding said workpiece and restraining radially outward flow of material of the workpiece and advancing a sizing punch into said sizing die to the workpiece to provide a controlled surface configuration on either axial side of said workpiece and to form a uniform outside diameter on said workpiece.

8. The extrusion process as set forth in claim 4 wherein the extrusion step is preceded by a sizing step whereby the workpiece which is generally cylindrical in shape is inserted in a sizing die, a backup punch located in said sizing die adjacent said blank, said sizing die surrounding said workpiece and restraining radially outward flow of material of the workpiece and advancing a sizing punch into said sizing die to form the workpiece to provide a controlled surface configuration on either axial side of said workpiece and to form a uniform outside diameter on said workpiece.

9. The extrusion process as set forth in claim 5 wherein the extrusion step is preceded by a sizing step whereby the workpiece which is generally cylindrical in shape is inserted in a sizing die, a backup punch located in said sizing die adjacent said blank, and sizing die surrounding said workpiece and restraining radially outward flow of material of the workpiece and advancing a sizing punch into said sizing die to form the workpiece to provide a controlled surface configuration on either axial side of said workpiece and to form a uniform outside diameter on said workpiece.

10. A gear extrusion process comprising the steps of inserting a first hollow blank within a die having internal teeth, the blank having received therethrough a mandrel with a precise diametrical fit within the central opening in the blank, a sleeve surrounding the mandrel and forming therewith a mandrel and sleeve assembly, advancing the mandrel and sleeve assembly and applying thereby an axial extruding force on the blank whereby the blank is partially extruded through the die tooth spaces, retracting the mandrel and sleeve assembly and placing a second hollow blank adjacent the first blank, and advancing the mandrel and sleeve assembly into engagement with the second blank whereby final extrusion of the first blank occurs as the second blank is partially extruded, said mandrel having a straight shaft portion and a circular land portion of larger diameter than the shaft portion, including the step of withdrawing said mandrel following extrusion whereby the land portion precisely sizes the inside diameter of the finished extruded part.

11. An extrusion die assembly comprising a circular extrusion die with internal teeth, a die holder supporting said die, a mandrel with a circular shaft portion of predetermined diameter, and a central opening in said holder receiving said die, said mandrel extending through said central opening and adapted to be received through a hollow gear blank, a sleeve punch surrounding said mandrel and forming therewith a mandrel and sleeve assembly, said sleeve being adapted to engage one axial side of said blank as said mandrel and sleeve assembly is advanced thereby extruding said blank through said die, the shaft portion of said mandrel providing radial support for the material of said blank thereby controlling the blank material displacement during extrusion which results in full, precise tooth development during extrusion, said mandrel having formed thereon a land portion of larger diameter than said shaft portion whereby the inside diameter of said hollow blank, following extrusion, is precisely controlled upon withdrawl of said mandrel and sleeve assembly in a direction opposite to the direction of the advance thereof during extrusion.

12. An extrusion die assembly comprising a circular extrusion die with internal teeth, a die holder supporting said die, a mandrel with a circular shaft portion of predetermined diameter, and a central opening in said holder receiving said die, said mandrel extending through said central opening and adapted to be received through a hollow gear blank, a sleeve punch surrounding said mandrel and forming therewith a mandrel and sleeve assembly, said sleeve being adapted to engage one axial side of said blank as said mandrel and sleeve assembly is advanced thereby extruding said blank through said die, the shaft portion of said mandrel providing radial support for the material of said blank thereby controlling the blank material displacement during extrusion which results in full, precise tooth development during extrusion, said die assembly including a die stress ring in said holder surrounding said circular die, said stress ring providing radial support for said die.

13. The method steps set forth in claim 10 wherein the mandrel provides radial support for the hollow blank as the blank is forced through the die tooth spaces thereby controlling the blank material flow so that fully formed teeth are extruded as radial material flow of blank material is resisted.

14. The method steps set forth in claim 13 wherein the mandrel is provided with a cylindrical portion of predetermined diameter adjacent one end of the sleeve whereby the internal diameter of the hollow extruded blank is controlled.

15. An extrusion die assembly for extruding a hollow blank comprising a circular extrusion die with internal teeth, comprising a full depth portion extending axially for a small part of the axial dimension of said die and a relatively long portion that is relieved to provide guiding action with minimum friction as the blank progresses through said die and to provide support for the full depth portion of the die teeth, a die holder supporting said die, a mandrel with a circular shaft portion of predetermined diameter, and a central opening in said holder receiving said die, said mandrel extending through said central opening and adapted to be received through said hollow gear blank, a sleeve punch surrounding said mandrel and forming therewith a mandrel and sleeve assembly, said sleeve being adapted to engage one axial side of said blank as said mandrel and sleeve assembly is advanced thereby extruding said blank through said die, the shaft portion of said mandrel providing radial support for the material of said blank thereby controlling the blank material displacement during extrusion which results in full, precise tooth development during extrusion, the outside diameter of the final extrusion being substantially equal to the outside diameter of said blank.

* * * * *